June 24, 1930.  S. H. CLAPP  1,768,351
BRAKE MECHANISM
Filed March 20, 1925   2 Sheets-Sheet 2
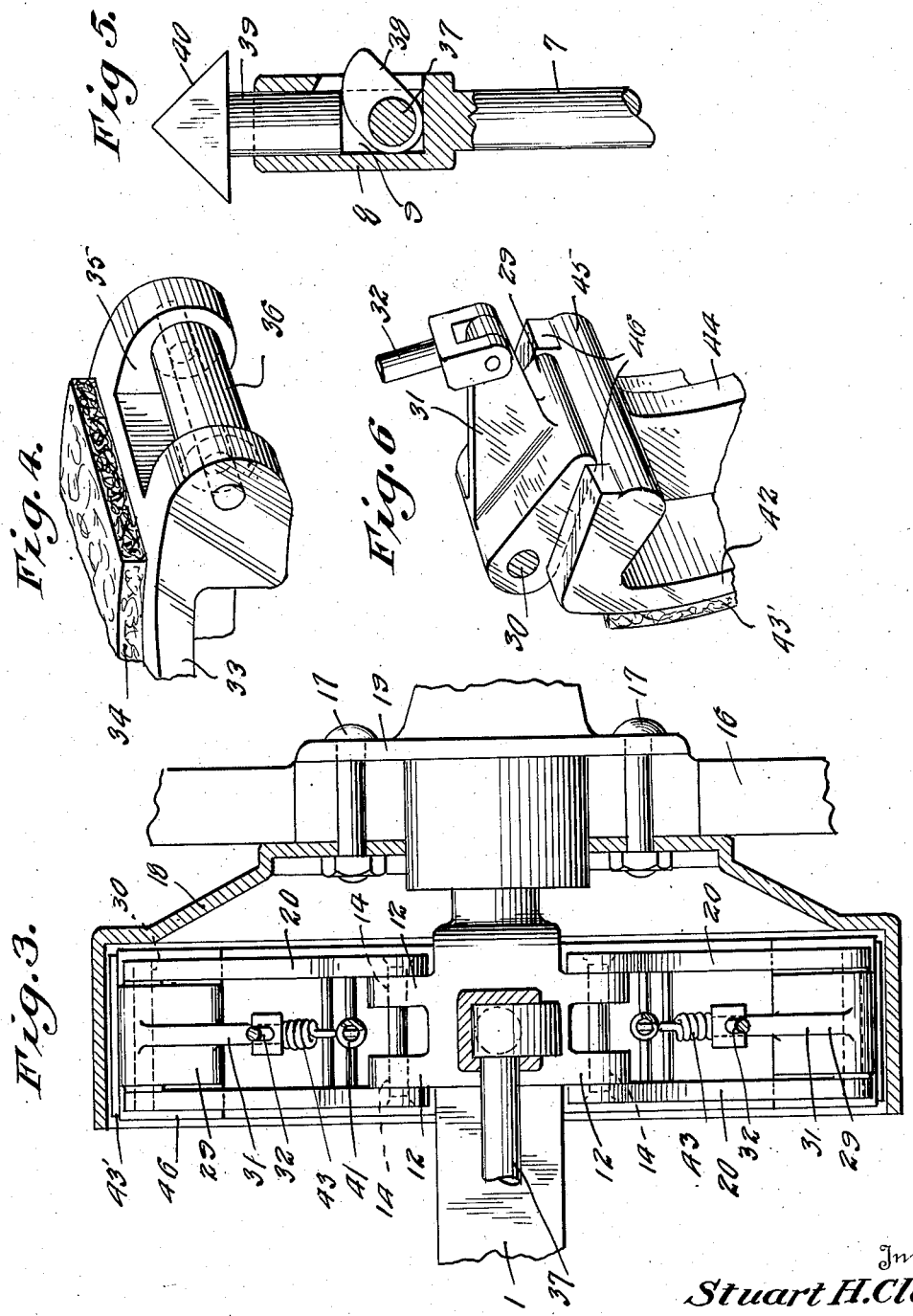
Inventor
Stuart H. Clapp
By Semmes & Semmes
Attorney

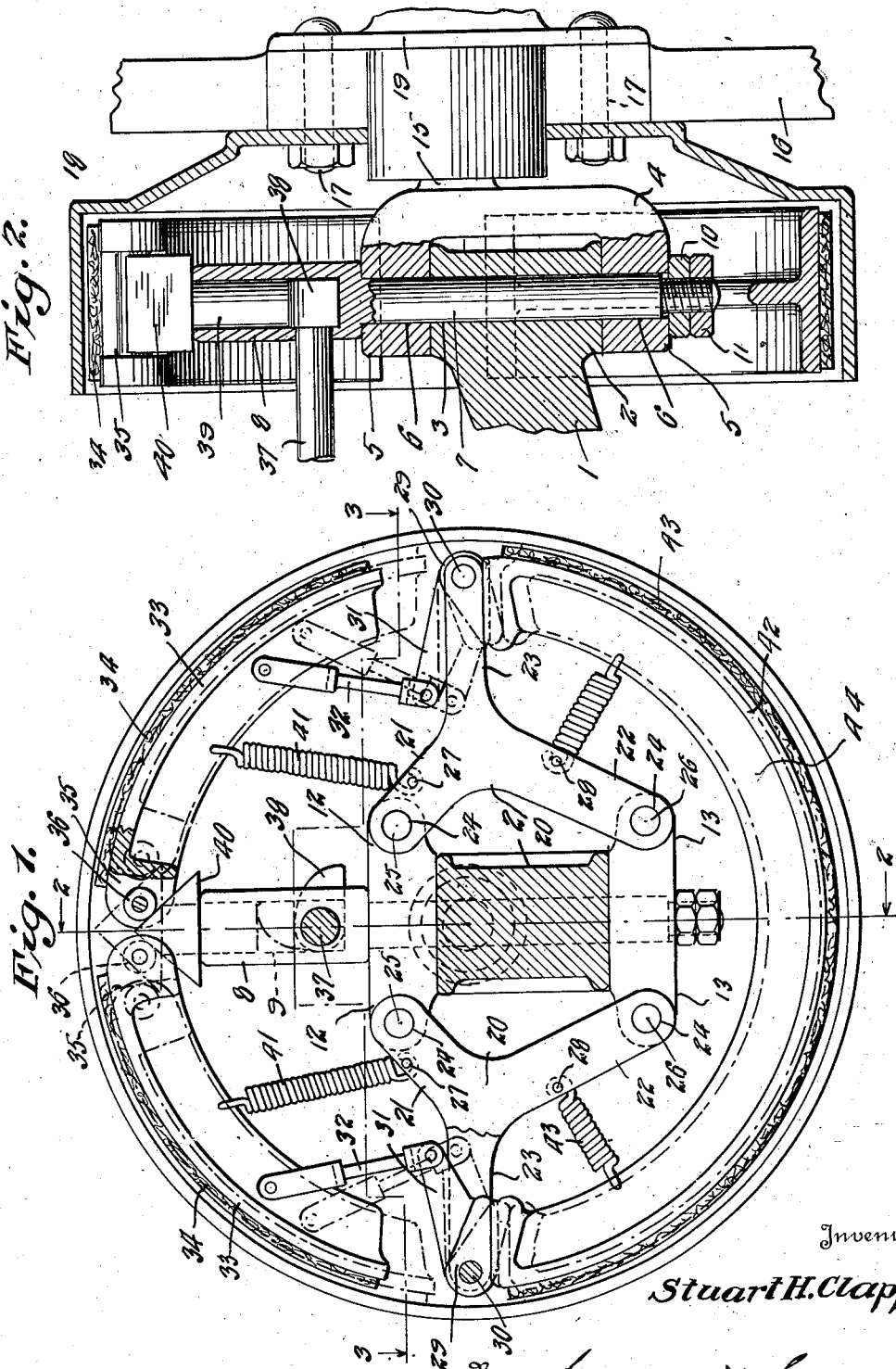

UNITED STATES PATENT OFFICE

STUART H. CLAPP, OF WASHINGTON, DISTRICT OF COLUMBIA, ASSIGNOR, BY MESNE ASSIGNMENTS, TO BENDIX BRAKE COMPANY, OF CHICAGO, ILLINOIS, A CORPORATION OF ILLINOIS

BRAKE MECHANISM

Application filed March 20, 1925. Serial No. 17,028.

This invention relates to brake mechanism.

An object of this invention is the production of a brake adapted for use in connection with the running gear of automobiles, auto-trucks and other vehicles.

Another object of this invention is the production of a brake applicable to automobiles and like vehicles and to so construct the same that it shall be strong, efficient, and readily controlled, and shall require the application of but little force in its operation.

Another object of this invention is the production of a brake comprising but few parts, to insure simplicity and inexpensiveness of manufacture, and to reduce the matter of replacement and repairs to a minimum.

Another object of this invention is the production of a brake which, owing to its simplicity and substantial construction, is not likely to get out of order, and in which the component parts are so related and connected by a linkage of levers that any force transmitted thereto will be increased or compounded through such connection, and further assisted by a friction set up upon the brake being set in operation.

A further object of this invention is the production of a brake adaptable for use upon the steering wheels of a vehicle, and to so construct the same that the brake shoes will, when the brake is applied, conform with the inside circumference of the brake drum and will exert a pressure over their full surface, regardless of the direction in which the wheel is traveling.

With these objects in view and such others as may hereinafter appear, my invention consists broadly in certain component and cooperative parts which I deem sufficient to carry out the fundamental principles herein involved. However, I wish it to be distinctly understood that I do not limit myself to the exact details herein shown and described, since various minor changes may be resorted to without sacrificing any of the principles or advantages of this invention.

In the drawings forming a part of this specification:

Figure 1 is a side elevation with shell removed, illustrating the brake in a normal position, and as in operation in dotted lines;

Fig. 2 is a vertical sectional view taken on line 2—2 of Figure 1;

Fig. 3 is a sectional view taken on line 3—3 of Figure 1;

Fig. 4 is an enlarged perspective detail view of the end of one of the secondary shoes;

Fig. 5 is an enlarged detail view partly in section of the operating cam, plunger and wedging member; and Fig. 6 is an enlarged detail view in perspective illustrating an end of a primary brake shoe with a cam bearing thereupon.

Referring by numerals to the drawings, 1 represents a stub axle of the usual or preferred type, having a cross head 2 in which is a vertical central bore 3. A steering knuckle 4, having arms 5 with registering apertures 6, is mounted upon the cross head 2 by a pintle 7. The pintle passes through the apertures 6 in the arms 5 on the steering knuckle 4, and the apertures 3 in the cross head 2. The pintle is formed with an elongated head 8 having a central bore 9, the object of which will hereinafter appear, and on its protruding end is threaded a tap 10 over which is placed a lock nut 11.

Formed upon both sides of the arms 5 on the steering knuckle 4 are corresponding and oppositely disposed upper and lower lugs 12 and 13 having registering longitudinal apertures 14, the object of which will hereinafter appear. The steering knuckle is also provided with a spindle 15 upon which is mounted a steering wheel 16.

Attached to the steering wheel 16 by a plurality of bolts 17 is a drum 18, or the drum may be formed as an integral part of the wheel hub 19, as illustrated in Figs. 2 and 3. The drum is of sufficient extent to project over the axis, extended, about which the wheel oscillates during steering.

Corresponding and oppositely disposed brackets 20, each having three arms 21, 22 and 23 with apertures 24 in the ends thereof, are mounted on the opposite sides of the arms 5 upon the lugs 12 and 13 by pins 100

25 and 26. The pins 25 pass through the apertures 14 in the lugs 12 and the apertures 24 in the bracket arms 21, and the pins 26 pass through the apertures 14 in the lugs 12 and the apertures 24 in the bracket arms 22, the heads of pins 25 and 26 being set in order that the brackets will maintain a rigid position upon the lugs 12 and 13. The corresponding arms 21 and 22 are further connected by rods 27 and 28.

The arms 23, supported by the arms 21 and 22 connected to the lugs 12 and 13 upon both sides of the arms 5, project in opposite directions in the same plane to positions relatively near the inner circumference of the drum 18. A cam 29 is mounted between each pair of the arms 23 by a pin 30. The cams 29 are provided with rocker arms 31 pivotally connected by rods 32 to arcuate or secondary brake shoes 33 having brake lining 34 upon the faces thereof, and bifurcated end portions 35 in which are mounted rollers 36.

A rod 37, adapted to be operated by any suitable braking power, is connected with and actuates a cam 38 mounted in the base of the vertical bore 9 in the head 8 of the pintle 7. A piston 39, also mounted in the bore 9 and free to revolve therein with the axis of the steering knuckle, bears against the cam 38. The piston 39 is provided with a wedge-shaped head 40 which bears against the rollers 36 in the bifurcated ends 35 of the secondary brake shoes 33, the head 40 fitting snugly between bifurcated end portions so as to prevent lateral movement. The brake shoes 33 are held in close engagement with the head 40 by coiled springs 41 connecting the shoes to the rods 27 between the arms 21.

A semi-circular or a primary brake shoe 42 having upon its face a brake lining 43 is formed with a central web 44 and flanged ends 45, the flanged ends being provided with shoulders 46 which form seats for the cams 29, and prevent any lateral movement of the brake shoe 42. The brake shoe 42 is held in close contact with the cams 29 by coiled springs 43 connecting the shoe to the rod 28 between the bracket arms 22.

In operation, the braking power on being transmitted to the shaft 37 actuates the cam 38 which causes the plunger 39 to move upward, thus forcing the wedge-shaped head 40 between the secondary brake shoes 33 and spreading them apart in engagement with the inner circumference of the brake drum 18. Since the secondary brake shoes 33 are connected by a linkage of levers and cams to the ends of the primary brake shoe 42, the result is a pressure at both ends of the primary shoe, tending to force it in contact with the inner circumference of the brake drum.

The force used to separate the secondary shoes 33 is transmitted through this linkage with somewhat increased or compounded leverage, and such mechanical action is further assisted by a friction set up between one of the secondary shoes and the inner circumference of the drum. This increase of pressure is transmitted through the linkage to the primary shoe, and such increased pressure is exerted in either direction of rotation, i. e., the secondary shoe traveling in the direction of rotation is assisted in its action upon the primary shoe by a friction set up between it and the brake drum.

It is to be noted that the torque of the revolving drum is taken at three points, i. e., the head of the plunger and the mountings of the two cams operating the primary shoe. Since the brake shoes are arcuate, and since the action of expansion is through the increase in the angle between the arcuate shoes, the shoes will conform with the inside circumference of the brake drum, thus bearing against the drum over its full surface.

Having thus described the various features of my invention, what I claim as new and desire to secure by Letters Patent is:

1. In a steering wheel brake, a steering knuckle, comprising a spindle, arms supporting the spindle, and lugs formed upon the arms.

2. In a steering wheel brake, a steering knuckle, comprising a spindle, arms supporting the spindle, corresponding upper and lower lugs formed upon the arms, and brackets supported upon the lugs.

3. In a steering wheel brake, a brake drum, a steering knuckle having arms supporting a spindle, corresponding upper and lower lugs formed upon the arms, brackets supported by the lugs, cams mounted in the free ends of the brackets, a primary brake shoe bearing against the cams, secondary brake shoes, linkage and levers connecting the secondary brake shoes with the cams, and means for forcing the secondary brake shoes in contact with the inner circumference of the brake drum.

4. In a steering wheel brake, a brake drum, a steering knuckle supporting a spindle, brackets mounted upon the steering knuckle, cams pivoted in the free ends of the brackets, a primary brake shoe having cam seats formed upon its ends, springs for maintaining the primary brake shoe in close engagement with the cams, secondary brake shoes, levers and linkage connecting the secondary brake shoes and cams, means for actuating the secondary brake shoes, and springs for maintaining the secondary brake shoes in close contact with the operating means.

5. A brake comprising, in combination, a retarding device, floating shoes arranged at the opposite ends of the retarding device, and power-multiplying means through which each shoe acts on the retarding device.

6. A brake comprising, in combination, a retarding device, floating shoes arranged at the opposite ends of the retarding device, and power-multiplying means through which each shoe acts on its end of the retarding device.

7. A brake comprising, in combination, a drum, a retarding device engageable with the drum, floating shoes arranged at the opposite ends of the retarding device and one or the other of which is urged by the drum in a direction to apply the retarding device, and power-multiplying means through which each shoe acts on the retarding device.

8. A brake comprising, in combination, a drum, a central floating shoe within the drum, a pair of floating shoes at the ends of the central shoe, and power-multiplying means through which the floating shoes act on the central shoe.

9. A brake comprising, in combination, a drum, a central floating shoe within the drum, a pair of floating shoes at the ends of the central shoe, and means through which the floating shoes act to apply the central shoe and which includes a stationary part taking the braking torque of the central shoe.

10. A brake comprising, in combination, a drum, a support, a central floating shoe within the drum, a pair of floating shoes at the ends of the central shoe, and a connection from the end of each of the pair of shoes to the corresponding end of the central shoe, the connections serving to apply the central shoe and also serving to transmit the braking torque of the central shoe directly to said support.

11. A brake comprising, in combination, a drum, a central floating shoe within the drum, a pair of floating shoes at the ends of the central shoe, and a power-multiplying connection from the end of each of the pair of shoes to the corresponding end of the central shoe, the connections serving to apply the central shoe.

12. A brake comprising, in combination, a central shoe, cams engaging opposite ends of the central shoe, and a pair of shoes arranged at opposite ends of the central shoe and operating the cams.

13. A brake comprising a central shoe, in combination with two other shoes acting on opposite ends of the central shoe with a power-multiplying leverage when the brake is applied.

14. A brake comprising, in combination, two pivoted shoes having adjacent ends, applying means acting on said ends, and a third shoe acted on adjacent its opposite ends with a power-multiplying leverage by said pivoted shoes respectively.

15. A brake comprising, in combination a drum, a fixed support adjacent the drum a pair of shoes within the drum, applying means acting on the ends of said shoes at one side of the drum to force them apart to apply the brake, means on which the opposite ends of said shoes are pivoted and which is mounted on the support and which takes the torque of the shoes pivoted on it when the brake is applied, and another shoe engageable with the same zone of the drum as the pair of shoes, opposite said applying device, and which is applied by said pair of shoes and the torque of which, when the brake is applied, is transmitted to said means on which the pair of shoes is pivoted.

16. A brake comprising, in combination, a drum, a fixed support adjacent the drum, a pair of shoes within the drum, applying means acting on the ends of said shoes at one side of the drum to force them apart to apply the brake, means on which the opposite ends of said shoes are pivoted and which is mounted on the support and which takes the torque of the shoes pivoted on it when the brake is applied, and another shoe engageable with the same zone of the drum as the pair of shoes, opposite said applying device, and which is applied by at least one of said pair of shoes.

17. A brake comprising, in combination, a drum, a fixed support adjacent the drum, a pair of shoes within the drum, applying means acting on the ends of said shoes at one side of the drum to force them apart to apply the brake, means on which the opposite ends of said shoes are pivoted and which is mounted on the support and which takes the torque of the shoes pivoted on it when the brake is applied, and another shoe engageable with the same zone of the drum as the pair of shoes, opposite said applying device, and which is applied by both of said pair of shoes.

18. A brake having three shoes, two of which are pivotally mounted and which are moved in opposite directions to apply the brake, and the third of which is moved at its opposite ends, in applying the brake, by said two shoes respectively with a power-multiplying leverage.

In testimony whereof I affix my signature.

STUART H. CLAPP.